Dec. 10, 1935.   C. B. STRANDGREN   2,023,750
FEATHERING PADDLE WHEELS
Filed March 3, 1933   5 Sheets-Sheet 4

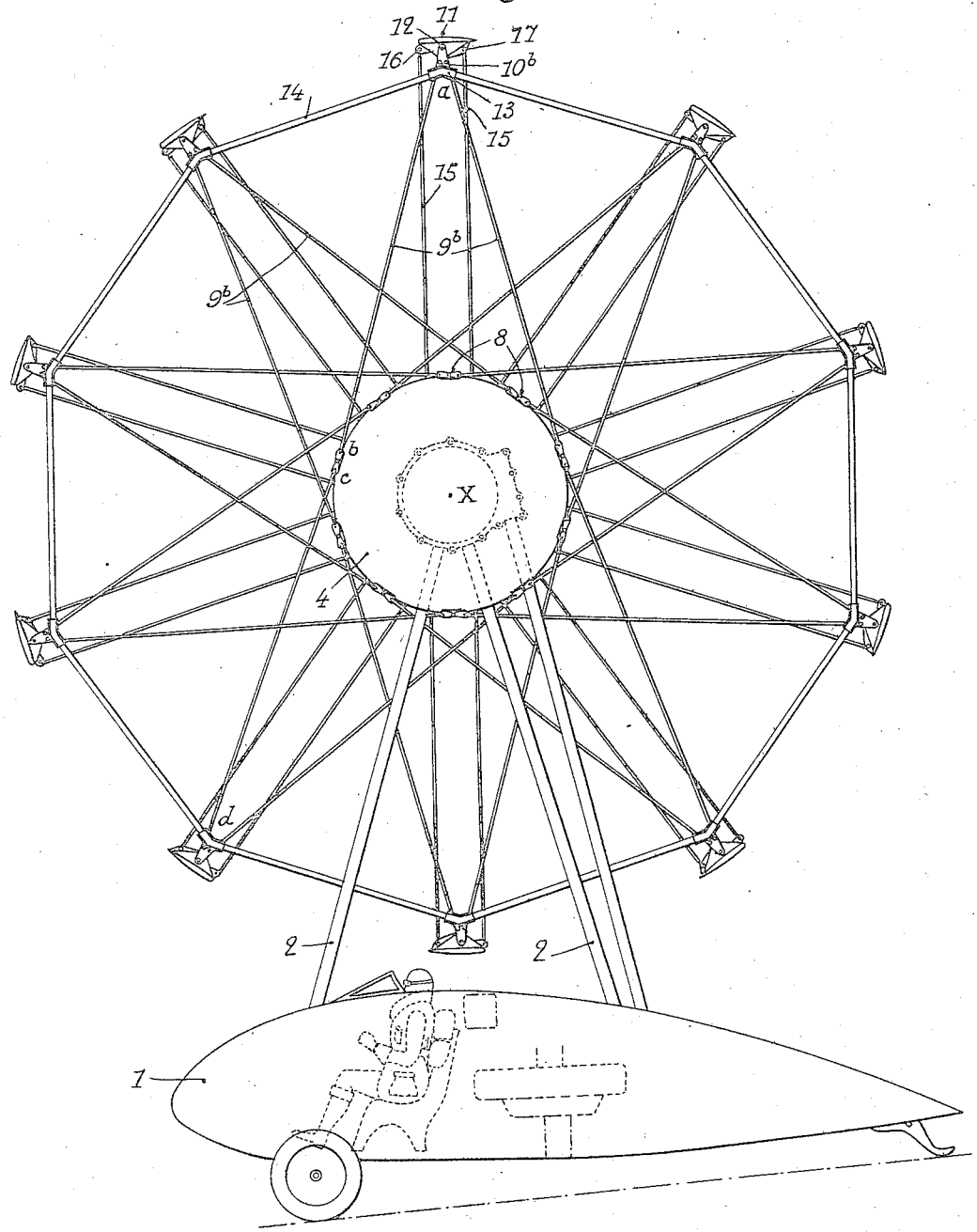

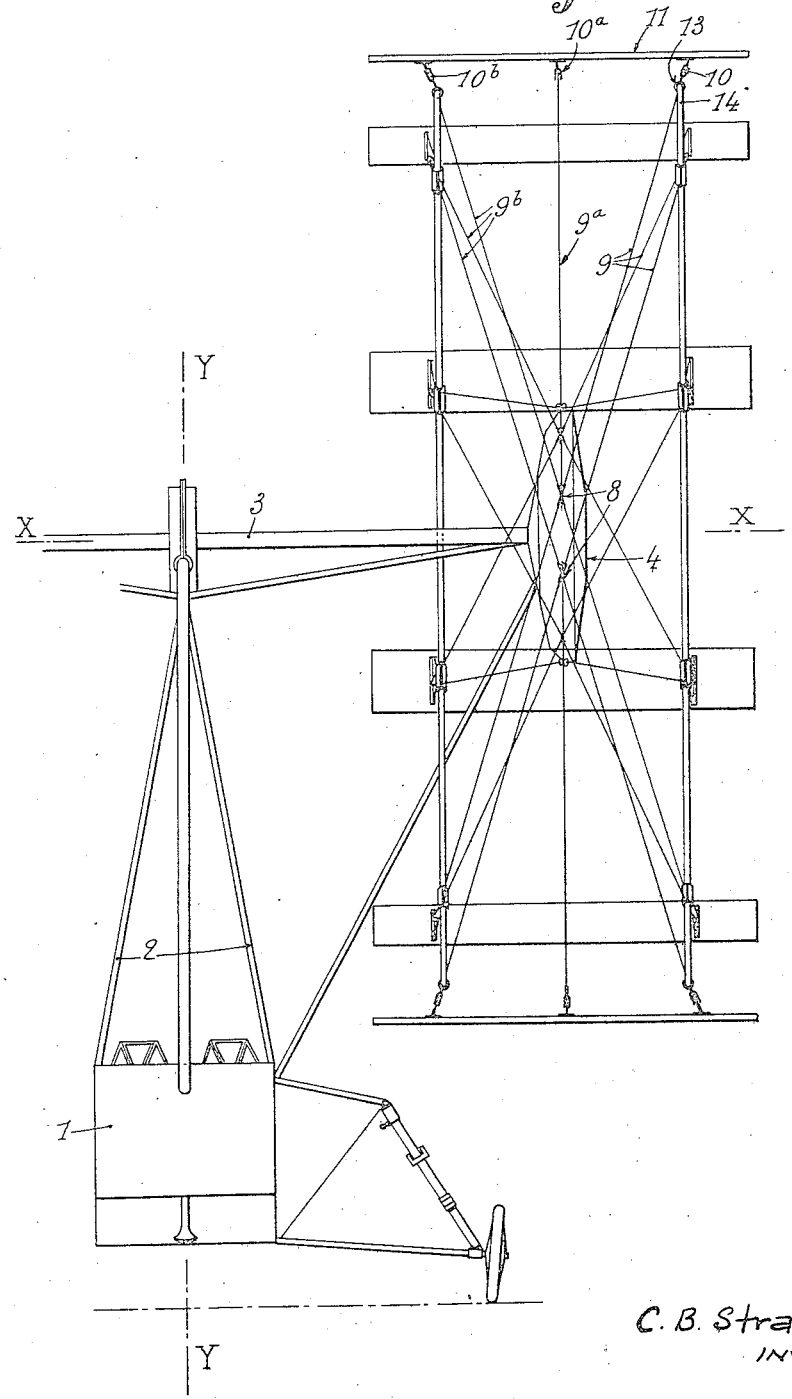

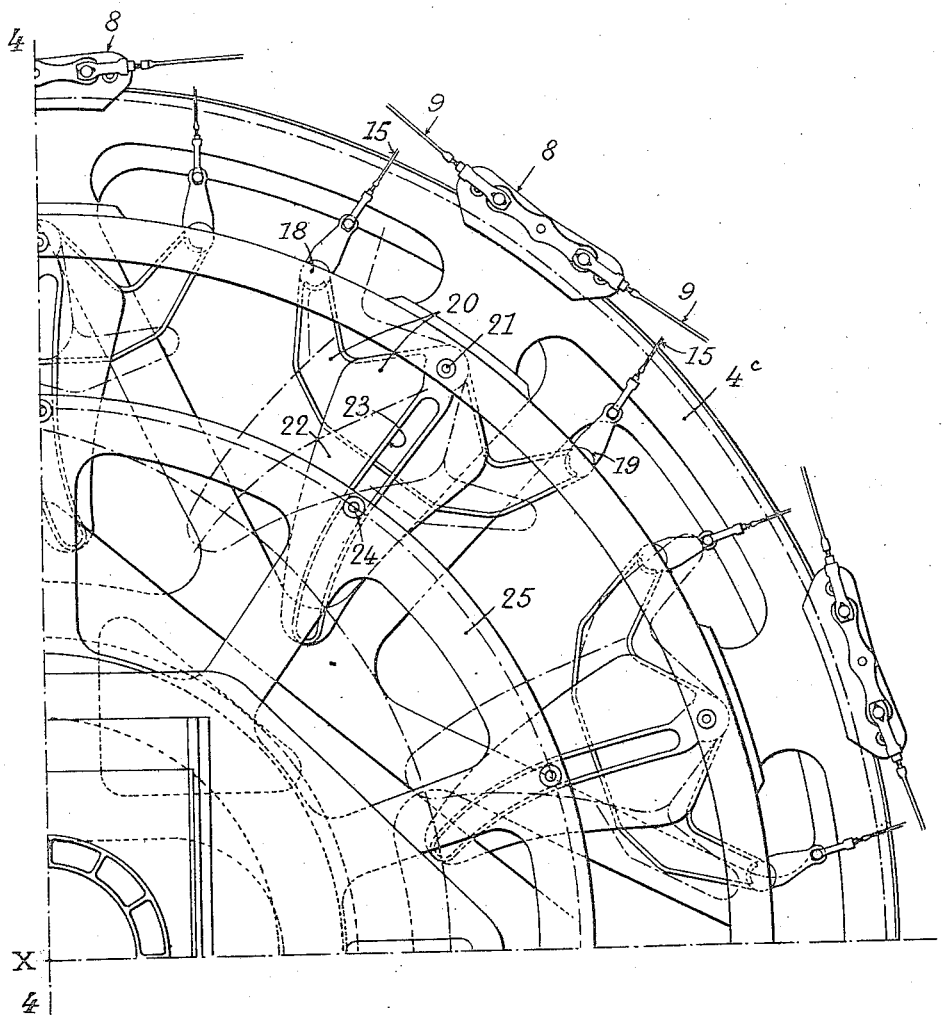

C. B. Strandgren
INVENTOR

By: Marks & Clark
Attys.

Fig. 9
Fig. 10
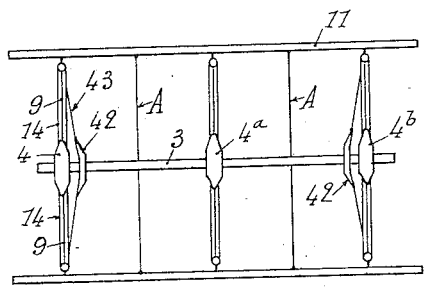
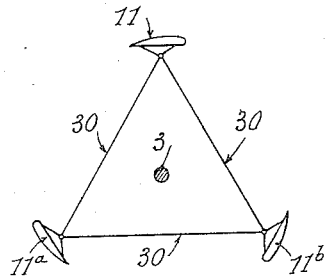
Fig. 11
Fig. 7
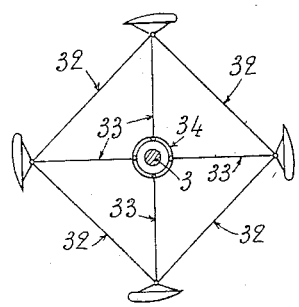
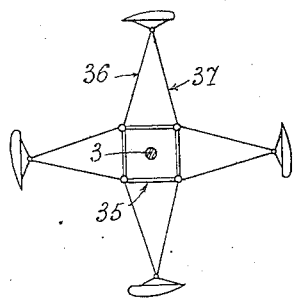
Fig. 8
Fig. 12
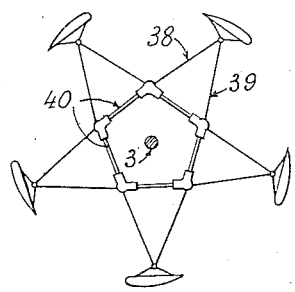
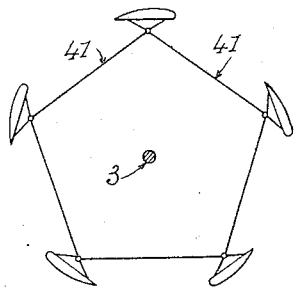
C. B. Strandgren
INVENTOR
By: Marks & Clerk
ATTYS.

Patented Dec. 10, 1935

2,023,750

UNITED STATES PATENT OFFICE 2,023,750

FEATHERING PADDLE WHEEL

Carl Bruno Strandgren, Versailles, France

Application March 3, 1933, Serial No. 659,547
In France March 11, 1932

7 Claims. (Cl. 244—16)

The present invention relates to feathering paddle wheels adapted for use either as a lifting and/or propelling apparatus travelling in a fluid, or as a motor adapted to be actuated by a fluid in motion.

The invention has for its object to provide a feathering paddle wheel of strong, light and sound construction.

According to one feature of the invention, the movable paddles, wings or blades are connected with the hub by bars, or like connecting members, which are so arranged that, irrespectively of the direction of the instantaneous aerodynamic reactions on the wings or the like, said connecting members are subjected to tensile stresses and substantially relieved from compression or bending stresses.

According to another feature of the invention, said connecting members consist of flexible members, such as wires or bars of small section, which can only withstand tensile, said wires or bars becoming rigid under the action of centrifugal force.

According to a further feature of the invention, said wings are connected together by rigid cross struts forming a circle or a polygon adapted to maintain the spacing of the paddles at the periphery of the wheel and to support the apparatus when resting on the ground, at which time the centrifugal force is null or is not sufficient to impart to the assemblage a sufficient rigidity.

When in flight, the centrifugal force stretches the wires or like members in the radial direction and thus gives the apparatus a rigidity which may be termed a "dynamic" rigidity, which permits of reducing to a minimum the weight of the parts which are adapted to resist compression, that is the heavy parts having a large cross-section, and which increases the dead weight and the drag.

This arrangement will afford, for an equal strength, a much smaller area exposed to the reaction of the fluid than with the use of radial members or struts having a "static" rigidity or subjected to compression, even if such members were given an outline of least resistance against the fluid; hence a much lighter construction can be secured, for a given mechanical strength.

According to another feature of the invention, a plurality of connecting members having substantially opposite directions preferably converge to a common attaching point on the wheel hub, whereby centrifugal force is transmitted to said attaching point, hence affording a reduced weight for the hub, which may be constructed of much lighter parts.

The same principle may be applied for increasing the resistance of the wings to the bending due to aerodynamic reaction and to centrifugal force, by the use of bracing wires or the like, which are adapted to resist tensile stresses, and are so arranged that the whole set of wings is caused to assist, as far as possible, the wing in consideration in resisting the bending stresses which act upon said particular wing at the instant considered.

This arrangement is particularly useful in the case in which the wings have a great axial length and are to be supported by two hubs, which are situated adjacent the ends of the wings and are located at a relatively great distance apart.

In the accompanying drawings, given solely by way of example, and which show an embodiment of the invention in the case of air vessels:

Fig. 1 is an elevational view of an improved lifting and propelling wheel according to the invention.

Fig. 2 is a rear view of the air vessel, the lefthand wheel being eliminated and the wings situated at the rear (at the front of the plane of the figure) being supposed to be removed.

Fig. 3 is a front view on a larger scale, of a portion of the hub, showing the means for attaching the members connecting the wings to said hub, as well as the device for the control of the oscillation of the wings.

Figs. 7 and 8 are diagrammatic end views showing modified forms of the wheel.

Fig. 9 is a diagrammatic elevational view of a modification of Fig. 6, only two of the wings being represented, for the sake of clearness.

Figs. 10 to 12 are end views showing various modifications of the invention, as applied to the connections between the wings.

In the form of construction shown in Figs. 1 and 2, to the body 1 of the flying machine are attached several struts 2 (whose cross-section may be circular or may have an outline of least resistance against the fluid), supporting a shaft 3, whose axis is X—X. At each end, and in symmetrical position with reference to the vertical longitudinal axis Y—Y, passing through the longitudinal axis of the body 1 (Fig. 2), shaft 3 carries two feathering paddle wheels constructed in accordance with the invention.

Each of said wheels comprises a hub 4, which is keyed to shaft 3 if the driving engine is mounted in the body 1, as shown, or is loose on shaft 3 if the engine is mounted on this shaft and close to the wheel.

Figure 5:
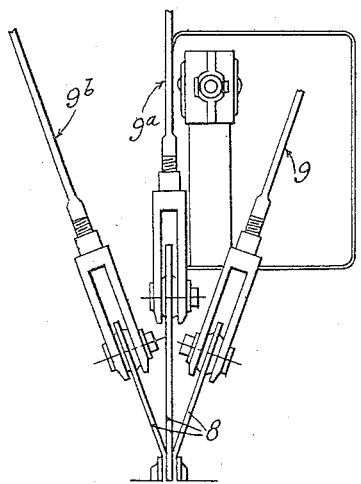
Fig. 5 is a plan view showing the means for attaching a group of flexible connecting members to said hub.
Figure 4:
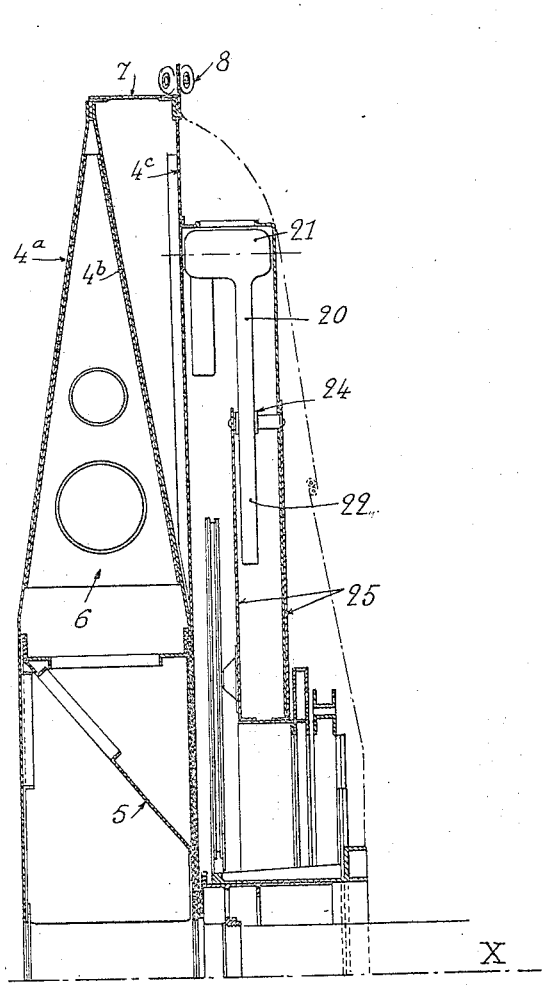
Fig. 4 is a cross-section on the line 4—4 of Fig. 3.

In the construction herein represented, the hub 4 consists essentially of three plates $4^a$—$4^b$—$4^c$ (Fig. 4) which are suitably connected by cross-plates 5—6—7. At the periphery of the hub, and preferably to the sheet-metal piece $4^c$, which is perpendicular to the axis X—X, are secured, by riveting, welding or the like, suitable attaching members 8. To each of the said members are attached two sets of connecting members, each comprising a plurality of diverging flexible connecting members 9—$9^a$—$9^b$; each member such as $ab$ (Fig. 1) of one set is substantially in line with a member such as $cd$ of the other set. Said flexible connecting members may consist of cables or wires of any suitable cross-section, for example circular, oval; in the shape of a willow leaf (two circular arcs joined together at very acute angles), or the like.

The three connecting member 9—$9^a$—$9^b$ of the two sets are attached at their outer ends to forked brackets 10—$10^a$—$10^b$ (Figs. 1 and 2) to which a wing 11 is pivoted on an axis 12, parallel to the axis X—X of hub 4.

Each wing 11 is thus connected with the hub 4 by two sets of three connecting members 9—$9^a$—$9^b$. The brackets 10 and $10^a$ situated at the ends of each wing are secured to obtuse-angled collars 13, for connecting the elements of a polygonal or circular belt 14, preferably made of metal tubes and which is adapted to maintain the wings in position when the wheel is idle and also to prevent the wings from moving laterally during flight.

The wings, pivotally mounted on pivot pins 12 as above stated, are controlled by any suitable control device, in such manner as to constantly form a proper angle of attack with the tangent to their trajectory into the fluid.

Any suitable control device may be provided, for example the one which is shown in the drawings, and which is of the type described in the specification of my Letters Patent No. 1,885,640. This device comprises two cables 15, which are attached at 16 and 17 to the wing 11, on either side of its pivot pin 12 (Fig. 1), and at 18 and 19 (Fig. 3) to the ends of a lever 20, pivotally mounted on a pivot pin 21, secured to the hub 4. Said lever 20 is provided with an appendage 22, in which is formed a slot 23, and in this latter is movable a roller 24, mounted on a member 25, which participates in the rotation of hub 4, but rotates about an axis which is eccentric with reference to the axis X—X of the hub. The eccentricity is adjustable, as set forth in my above-mentioned patent.

Figure 6:
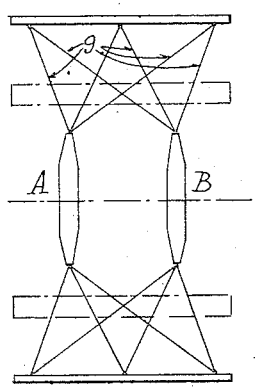
Fig. 6 is a diagrammatic view showing a wheel with double hub.

It is obvious that the hub may be given any suitable shape. Figure 6 shows a double hub A, B, having two sets of attaching points and cross-connections 9 joining the wings to said double hub.

In the modification shown in Fig. 7, corresponding to the case of a wheel with four wings, each wing is connected with a small rectangular frame 35 by two bracing cables or wires 36—37.

In the case of a wheel with five wings (Fig. 8) a similar arrangement can be employed, each wing being connected by two bracing cables or wires, with a rigid pentagonal or circular frame 40. The outer belt is omitted in Figures 7 and 8.

When the wings have a material length, as in the case of Figure 9, they are subjected, due to centrifugal force and to the aerodynamic forces to bending stresses which have a tendency to curve the wings out of their planes. As the centrifugal force always preponderates, even over a centripetal aerodynamic resultant, the wings tend to offer a concavity on the side adjacent the centre of the wheel.

In order to prevent or minimize this bending, without unduly increasing the weight of the wings or the number of hubs 4—$4^a$—$4^b$, the invention provides for connecting the wings together by a set of connecting members A adapted to withstand tension traction, in such manner that the bending stress acting upon a wing at a given instant will be transmitted, by means of said connecting members, to one or more wings which will be subjected, at the same instant, to a bending stress which counteracts the bending of the first wing. The wings thus act in mutual cooperation in order to oppose their individual bending, the major part of the stresses being brought upon the connecting or bracing wires.

In the case of a wheel with three wings (Fig. 10) the set of bracing wires A comprises three elements 30 consisting of wires, bars of small section, or the like, by which the wings 11 are connected together. All bending of the wings 11, which tends to move the point 31 away from the shaft 3, is transmitted by the bracing wires 30 to the wings $11^a$ and $11^b$. If the aerodynamic stress acting upon the wing 11 exceeds the aerodynamic stresses acting upon the wings $11^a$—$11^b$, the balance of the funicular system will be maintained, owing to the fact that the centrifugal force acting upon the wings is always plainly preponderant and maintains the said wires in the stretched position, so that the triangle is thus made rigid. On the other hand, any motion of translation of this triangle in its own plan could only take place by a bending of the wings $11^a$—$11^b$, which thus aid the wing 11 in order to keep the system in a rigid condition.

The foregoing derives from the fact that the sum of the normal components $Pn$ of the aerodynamic forces acting upon the wings does not exceed the normal component $Fn$ of the centrifugal force acting upon each wing, which can be readily demonstrated by applying the theorem of Lagrange about the "virtual work". By "normal component" I means the component directed along to the radius vector passing through the instantaneous centre of rotation of the wheel.

It will be noted that the above described connections form a very light device, which is however very strong and offers only an insignificant aerodynamic resistance against the fluid or drag.

In the case of a four-wing wheel, the same result can be obtained by the use of lateral bracing wires 32 (Fig. 11) and of diagonal bracing wires 33, these latter being attached to a small rigid frame 34 surrounding the shaft 3, in case this shaft should extend throughout the whole length of the wheel.

The arrangements shown in Figs. 7 and 8 might also be used to connect the wings together.

It is further possible (Fig. 12) to connect the wings together by lateral bracing wires 41, but this arrangement may not be suitable for all cases, and it will usually be necessary to additionally connect the wings by diagonal bracing wires.

Having thus set forth the principle of connecting the wings together by members which are exclusively adapted to withstand tensile stresses and are made rigid by the centrifugal force, in such manner that one or more of the wings will assist another wing in resisting bending stress, the application of this principle to each particular case, according to the number of wings of the wheel, can be easily carried out by those skilled in the art, the constructions shown in the drawings being obviously given only by way of example.

Fig. 9 shows, at 42, two auxiliary hubs which are connected with the blades by inclined bracings 43, adapted to prevent the displacement of the wings in a direction parallel to shaft 3.

Obviously, the invention is not limited to the forms of construction herein described and represented, which are given solely by way of example. In particular, the control of the oscillation of the wings may be effected as desired, and does not form part of the present invention.

Having now described my invention what I claim as new and desire to secure by Letters Patent is:

1. In a feathering paddle wheel, a hub, a number of pivotal wings arranged circularly, flexible connecting members between said hub and the pivotal axes of said wings, said members being so arranged that to each of them corresponds, another one which is substantially aligned therewith, both being attached substantially at the same point on the periphery of the hub, and each wing being connected, through said hub and flexible members, with two other wings symmetrically disposed with respect to the diameter of the wheel which crosses the pivotal axis of said first wing, whereby the components of the centrifugal and aerodynamic forces along said members are substantially balanced without exerting any substantial stress on said hub, and at least one rigid belt for connecting the outer ends of said members.

2. A feathering paddle wheel as claimed in claim 1, further comprising at least one auxiliary hub and inclined nonrigid traction resisting members attached to said auxiliary hub and to said wings substantially at the same point than said flexible connecting members.

3. In a flexible machine, a propelling and lifting feathering paddle wheel adapted to rotate at high speed, embodying a hub, a number of pivotal wings arranged circularly, flexible connecting members between said hub and the pivotal axes of said wings, said members being so arranged that to each of them corresponds another one which is substantially aligned therewith, both being attached substantially at the same point on the periphery of the hub, and each wing being connected, through said hub and flexible members, with two other wings symmetrically disposed with respect to the diameter of the wheel which crosses the pivotal axis of said first wing whereby the components of the centrifugal and aerodynamic forces along said members are substantially balanced without exerting any substantial stress on said hub, and at least, one rigid belt for connecting the outer ends of said members.

4. In a feathering paddle wheel, a hub, a number of pivotal wings arranged circularly, flexible members for connecting each wing with said hub and with two other wings symmetrically arranged with respect to the diameter of the paddle wheel which crosses the pivotal axis of said first wing, said connecting members being arranged by pairs in such a manner that the members of each pair are substantially aligned and both attached substantially at the same point on the periphery of the hub, while the outer ends of said members are respectively connected with two different wings, and at least one rigid belt for connecting the outer ends of said members.

5. In a feathering paddle wheel, a hub, a number of wings arranged circularly, flexible members arranged by pairs for connecting each wing with two other wings through the said hub, the two connecting members of each pair being substantially aligned with one another, attached to the periphery of the hub substantially at the same point and respectively connected, at their outer ends, with two different wings, whereby the components of the centrifugal and aerodynamic forces along said members will be substantially balanced without exerting any substantial stress on said hub, and at least one rigid belt for connecting the outer ends of said members.

6. In a feathering paddle wheel, a hub, a number of pivotal wings arranged circularly, two sets of flexible members for connecting, through said hub, each wing respectively with two other wings symmetrically arranged with respect to the diameter of the paddle wheel which crosses the pivotal axis of said first wing, the flexible members in each set being substantially attached at the same point on the periphery of the hub, arranged by pairs and substantially aligned with one another in each pair, and rigid belts for connecting the outer ends of said flexible members.

7. In a feathering paddle wheel, a hub, a number of wings arranged circularly, a pivotal axis for each of said wings, flexible connecting members between said pivotal axes and said hub, said members being so arranged that to each of them corresponds another one substantially aligned therewith, both being substantially attached at the same point on the periphery of the hub, and each of said axes being connected, through said hub and flexible members, with two other axes which are symmetrically disposed with respect to the diameter of the wheel which crosses said first axis, whereby the components of the centrifugal and aerodynamic forces along said members are substantially balanced without exerting any substantial stress upon said hub, and at least one rigid belt for connecting the outer ends of said members.

CARL BRUNO STRANDGREN.